United States Patent

[11] 3,601,482

| | | |
|---|---|---|
| [72] | Inventor | Donald M. Harvey<br>Rochester, N.Y. |
| [21] | Appl. No. | 868,696 |
| [22] | Filed | Oct. 23, 1969 |
| [45] | Patented | Aug. 24, 1971 |
| [73] | Assignee | Eastman Kodak Company<br>Rochester, N.Y. |

[54] AUTOMATIC FOCUSING MECHANISM FOR A LAP DISSOLVE PROJECTOR
10 Claims, 9 Drawing Figs.

[52] U.S. Cl. .................................................. 353/101,
  353/83, 353/86, 353/90
[51] Int. Cl. .................................................. G03b 3/10
[50] Field of Search........................................... 353/82, 83,
  85, 86, 90, 93, 101, 69; 352/140

[56] References Cited
UNITED STATES PATENTS

| 3,205,766 | 9/1965 | Ewald et al. .................. | 353/101 X |
| 3,249,001 | 5/1966 | Stauffer ........................ | 356/101 |
| 3,282,155 | 11/1966 | Cleary et al. ................. | 353/86 X |

FOREIGN PATENTS

| 764,333 | 12/1956 | Great Britain ................ | 353/82 |

Primary Examiner—Harry N. Haroian
Attorneys—Robert W. Hampton and Steve W. Gremban ABSTRACT: A lap dissolve projector having mechanism for automatically focusing film images in a pair of film projection lens systems for maintaining a constant lens-to-film distance for each system in which the film image is in focus. An optical focusing system for each film comprises a lens for focusing a radiation source on the corresponding film, and a lens for focusing the reflected radiation from the film onto a single pair of closely spaced radiation sensitive elements. The output of the radiation sensitive elements is supplied to a drive motor for adjusting the lens-to-film distance to maintain image focus. A disabling member for the optical focusing systems is selectively movable between two positions for alternately disabling one of the film projection systems and its corresponding optical focusing system and enabling the other film projection system and its corresponding optical focusing system.

PATENTED AUG 24 1971
3,601,482
SHEET 1 OF 3
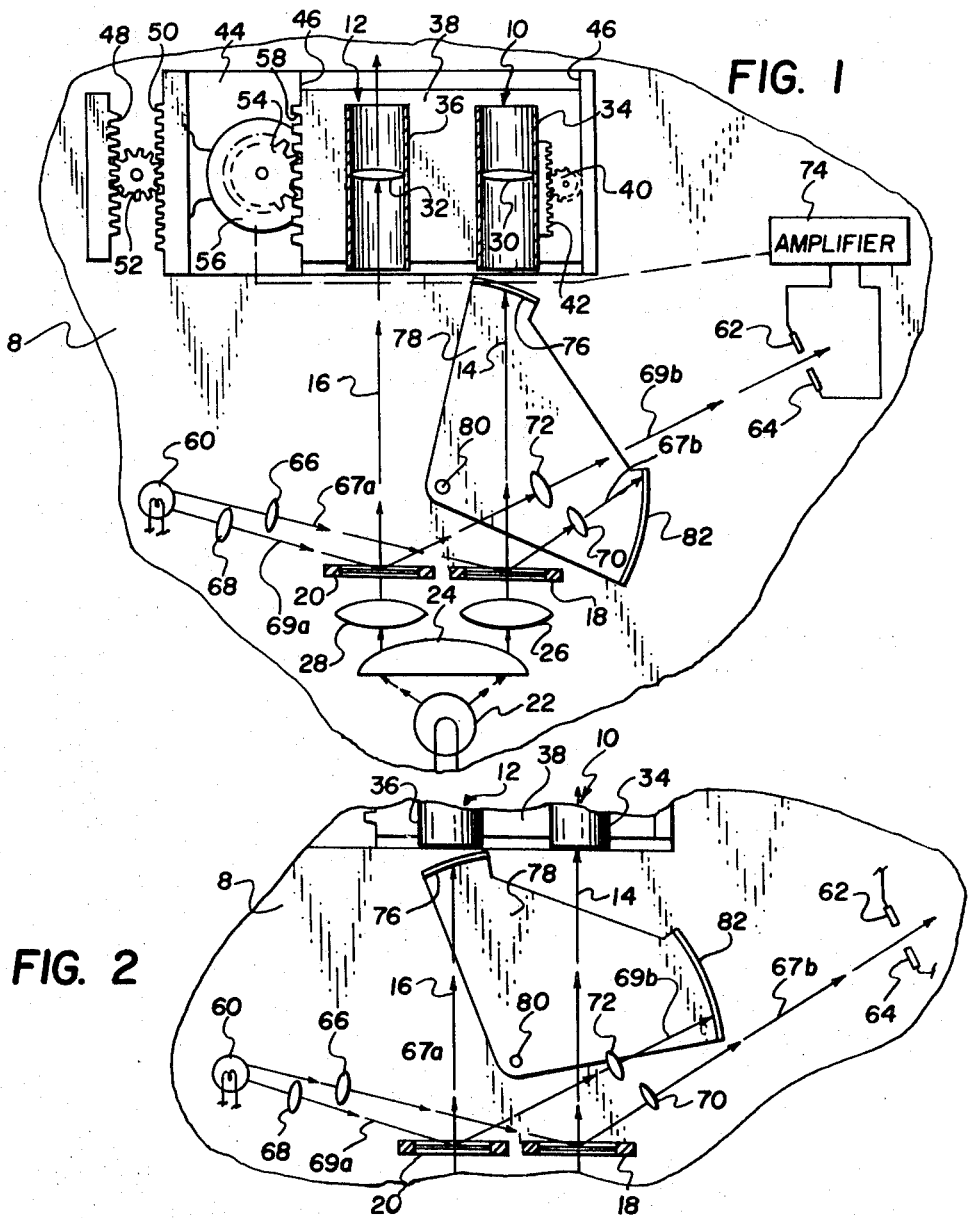
FIG. 1
FIG. 2
FIG. 3
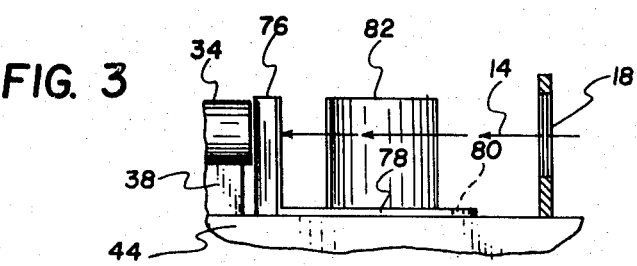
DONALD M. HARVEY
INVENTOR.
BY *Steve W. Gremban*
*Robert W. Hampton*
ATTORNEYS

DONALD M. HARVEY
INVENTOR.

BY *Steve W. Grambow*
*Robert W. Hampton*
ATTORNEYS

PATENTED AUG 24 1971

DONALD M. HARVEY
INVENTOR.

BY *Steve W. Glambou*

*Robert W. Hampton*
ATTORNEYS 3,601,482

AUTOMATIC FOCUSING MECHANISM FOR A LAP DISSOLVE PROJECTOR

BACKGROUND OF THE INVENTION

1. Field of the Invention

This invention relates generally to automatic focusing mechanisms, and more specifically to an automatic focusing mechanism for a lap dissolve projector.

2. Description of the Prior Art

Automatic focusing projectors of the type having optical means to sense the film position along the optical projection axis and to maintain an established distance between the film and the film image focusing lens of the projector at which the film image is in focus are well known in the art. Any distortion or movement of the film along the optical projection axis, due to creeping, buckling, or popping of the film, is compensated for by automatically adjusting the lens-to-film distance along the optical axis to the established distance to maintain film image focus on the screen.

It is also known in the art to provide lap dissolve photographic projectors of the type having two separate projecting systems for projecting film images onto the same viewing area of a screen. Such lap dissolve projectors normally comprise an illumination source, a pair of spaced film image projecting lenses, and a pair of corresponding spaced film mount gates for positioning film mounts between the projecting lenses and the illumination source. In such lap dissolve slide projectors, when the film image on the slide in the first projecting system is being projected onto a screen, the second projecting system is disabled by cutting off the illumination so that the film image of the second slide will not be projected onto the screen. This may be accomplished by blocking off the projection system by a shutter or the like or by cutting off the power to the illumination system. The lap dissolve takes place gradually enabling the first projecting system to gradually increase the intensity of the projection illumination so that the projected image on the screen will gradually increase in intensity to a maximum intensity. While the first projecting system is gradually enabled, the second projecting system is gradually disabled, and the two actions occur substantially simultaneously. Accordingly, as the projected film image of the second projecting system gradually increases to a maximum intensity, the projected film image of the first projecting system, which is at maximum intensity, gradually fades and recedes away or dissolves.

If automatic focusing is desired for lap dissolve slide projectors, it is necessary to provide each of the slide projecting systems with its own automatic focusing mechanism for projecting each slide image in proper focus in the event of slide distortion or movement. A disadvantage of such an automatic focusing system for a lap dissolve projector is that two separate and complete automatic focusing mechanisms must be provided for each projector, thereby greatly increasing the cost of the projector. Furthermore, the space limitations in most projectors, such as slide projectors, make it difficult, if not impossible, to incorporate two separate and distinct automatic focusing mechanisms in one projector.

SUMMARY OF THE INVENTION

This invention includes within its scope an automatic focusing mechanism for a lap dissolve projector having dual film image carriers, such as slides, and dual film image projecting systems in which a single automatic focusing mechanism serves both of the film projecting systems. The automatic focusing mechanism has dual optical focusing systems for focusing a radiation source on each of the films, and for focusing the reflected radiation from the films onto a pair of closely spaced radiation sensitive elements common to both focusing systems. A disabling means is provided for the optical focusing systems which is selectively movable between two positions for alternately disabling one of the film projecting systems and its corresponding optical focusing system and enabling the other film projecting system and its corresponding optical focusing system.

The invention and its objects and advantages will become more apparent in the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a top plan view in diagrammatic form of an automatic focusing mechanism for a lap dissolve slide projector, in which a disabling means is shown in a first position for disabling the optical focusing system and film projecting system for the first slide;

FIG. 2 is a segmental view of the apparatus of FIG. 1 in which the disabling means is in a second position for disabling the optical focusing system and film projecting system for the second slide and enabling the optical focusing system and film projecting system for the first slide;

FIG. 3 is a segmental side elevational view of the apparatus of FIG. 2;

DESCRIPTION OF THE PREFERRED EMBODIMENT

Figures 4A, 4B:
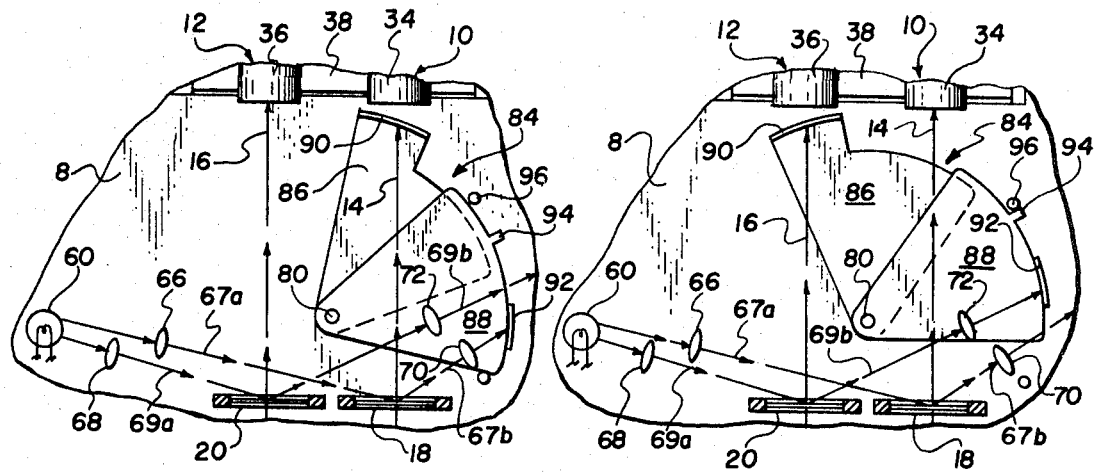
FIG. 4A is a segmental top plan view of another embodiment of the disabling means of FIGS. 1 and 2 in one position.
FIG. 4B is a view similar to FIG. 4A showing the disabling means in another position.

Because automatic focusing projectors are well known, the present description will be directed in particular to elements forming part of or cooperating more directly with the present invention, projector elements not specifically shown or described herein being understood to be selectable from those known in the art.

As seen in schematic form in FIG. 1, the invention is shown embodied in a lap dissolve projector such as a slide projector 8 having dual slide projecting systems 10, 12 defining optical paths or axes 14, 16 respectively, for a pair of film mounts or slides 18, 20 respectively, whose images are to be projected. The projector has an illumination source common to both projecting systems 10, 12 shown as a lamp 22, a heat filter 24 common to both of the projecting systems, and condenser lenses 26, 28 for the systems 10, 12, respectively, for collecting the illumination and directing it through the pair of slides 18, 20 held in spaced, aligned relation by any suitable slide gate mechanism, not shown. The illumination is directed through a pair of slide image focusing lenses 30, 32 for projecting each slide image along its optical axis 14, 16, respectively, in focus onto some remote plane such as a screen. Each of the slide image focusing lenses 30, 32 is mounted in a corresponding lens turret 34, 36 respectively; turret 36 is fixed to a support plate 38 and turret 34 is slidably mounted on support plate 38 and is movable by a pinion 40 rotatably supported by plate 38 engageable with a gear rack 42 on turret 34. Movement of pinion 40 permits manual focus of lens 30 relative to lens 32 for matching the lenses so that film images projected by the dual slide projecting systems 10, 12 are in focus. Once the focusing lenses 30, 32 are matched by movement of pinion 40, if the projected image should move out of focus for any reason, it is possible to manually focus the lenses 30, 32 by movement of a housing 44 on which support frame 38 is mounted for sliding movement along guideways 46. This may be accomplished by a manual focus control comprising any suitable gear and rack arrangement such as a fixed rack 48 on the projector, a rack 50 on housing 44 spaced therefrom, and a manually rotatable pinion 52 interposed between and in engagement with racks 48, 50 for moving housing 44 relative to the projector 8. It is also possible to focus lenses 30, 32 by movement of frame 38 by a pinion 54 driven by a bidirectional motor 56 mounted on housing 44 and engageable with a rack 58 on frame 38. The motor 56 is powered by an automatic focusing mechanism, now to be described.

The automatic focusing mechanism for the lap dissolve slide projector 8 comprises an automatic focusing radiation source shown as in incandescent lamp 60, and radiation sensing means in the form of a pair of closely spaced radiation sensitive cells such as photoelectric cells 62, 64. A pair of optical focusing systems is interposed between radiation source 60 and sensing means 62, 64 comprising a pair of lenses 66, 68 for imaging or focusing the lamp filament of radiation source 60 on slides 18, 20 respectively along portions 67a, 69a respectively of separate optical focusing paths. The optical focusing systems further comprise a pair of reimaging or refocusing lenses for focusing the radiation reflected from the slides onto the radiation sensing means 62, 64 respectively along portions 67b, 69b of the optical focusing paths.

The photoelectric cells 62, 64 of the radiation sensing means are electrically connected to an amplifier 74, and the output there of to motor 56. The amplifier 74 may be any suitable amplifying circuit of the type disclosed in copending U.S. patent application Ser. No. 648,265, now Pat. No. 3,466,125 entitled "Focus Adjusting Circuitry for a Slide Projector," filed in the name of William E. Jordan and Franklin D. Kottler on June 23, 1967. The photoelectric cells 62, 64 may be photoresistive devices whose impedance varies with the amount of radiation impinging upon the cell. When the radiation is focused at a "null" point between the cells 62, 64, the cells are equally radiated and have approximately no resistance so that the electrical voltage supplied to the input of the amplifier is approximately zero. As the focused radiation shifts to one of the cells, and away from the other cell, current will flow in one portion of the differential amplifier causing motor 56 to be driven in the proper direction to refocus the projected slide and to reposition the focused radiation at the "null" point between photoelectric cells 62, 64.

The film or slide image dissolve function between the two projecting systems 10, 12 is provided in the automatic focusing lap dissolve projector of this invention by a laterally extending mask 76 shown as a flange on a masking plate member 78 pivotal at 80 and movable between a first position as seen in FIG. 1 in which flange or mask 76 intercepts a light beam in film projecting system 10, to a second position as seen in FIG. 2 in which mask 76 intercepts a light beam in film projecting system 12. The masking member 78 is movable to achieve the dissolve function by any suitable projector mechanisms such as the film transport mechanism, not shown. The masking member 78 in addition has another similar laterally extending mask or flange 82 for disabling or intercepting one of the portions 67b, 69b of the two automatic focusing optical paths. In the first position of masking member 78 seen in FIG. 1, the automatic focusing optical path 67a, 67b for slide 18 is disabled in timed relation to the disabling of projecting system 10 by mask 76. In the second position of masking member 78 as seen in FIG. 2, the automatic focusing optical path 69a, 69b for the second slide is disabled in timed relation to the disabling of projecting system 12 by mask 76. By varying the width and location of the automatic focusing mask 82 relative to mask 76, the automatic focusing optical path for the slide image to be projected may be enabled at the earliest possible time to permit maximum focus correction for that slide image before it is projected at maximum intensity. The automatic focusing optical systems may be adjusted to produce a filament image on slides 18, 20 and on photocells 62, 64 of the same size and brightness by choosing appropriate focal lengths and equal "f" numbers for the lenses 66, 68, 70 and 72.

In FIGS. 4A and 4B, another embodiment of the disabling means is shown designed to enable the optical focusing path for the film image to be projected at the earliest possible time during a slide dissolving operation. This is accomplished by providing masking means comprising two pivotally mounted, frictionally engaged leaf plates 86, 88 having upturned flanges or masks 90, 92 respectively, mask 90 for alternately blocking and unblocking the film projection systems 10, 12 and mask 92 for alternately enabling and disabling the optical focusing systems 67a, 67b and 69a, 69b. When masking plates 86, 88 are moved from the position seen in FIG. 4A toward the position seen in 4B to commence dissolving from one slide image to the other, the plates 86, 88 move together by virtue of the frictional force therebetween causing mask 92 to relatively quickly disable or block the optical focusing path 69a, 69b for the projected slide 20, and enable the focusing optical path 67a, 67b for slide 18 which is to be projected. Continued movement of masking plate 84 causes lug 94 on masking plate 88 to engage a stop 96 so that mask 92 will remain in the blocking position as seen in the FIG. 4B position. Movement of the masking plates 86, 88 in the reverse direction from the FIG. 4B position to the FIG. 4A position to provide another slide dissolve, causes plate 88 and mask 92 to immediately return to its original FIG. 4A position blocking or disabling the previously enabled focusing optical path 67a, 67b and remaining in such position until the slide dissolve operation is completed.

Figure 5B:
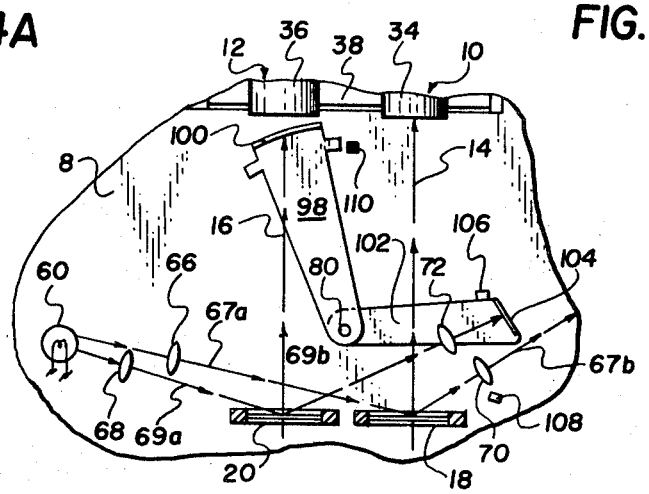
FIG. 5B is a view similar to FIG. 5A showing the disabling means in a different position.
Figure 5A:
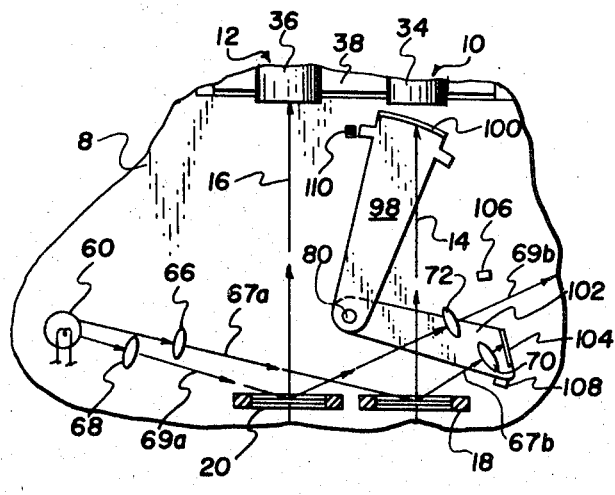
FIG. 5A is a view similar to FIG. 4A showing still another embodiment of the disabling means.

In still another modification of the disabling means shown in FIGS. 5A and 5B, the masking means comprises a pivotally mounted plate 98 having a laterally extending mask 100 for alternately blocking and unblocking the film projection systems 10, 12. Another pivotally mounted plate 102 has a laterally extending mask 104 for alternately enabling and disabling the optical focusing systems 67a, 67b and 69a, 69b. The plate 98 is movable between its FIG. 5A position in which film projection system 10 and its corresponding optical focusing system are disabled and film projection system 12 and its corresponding optical focusing system are enabled to its FIG. 5B position in which the reverse occurs. Movement of plate 102 is accomplished by spaced electromagnets 106, 108, each of which is engageable with one side of metal plate 102. The electromagnets 106, 108 are controlled by a double throw switch 110 actuated by plate 98 shortly after the plate begins its movement from one position to the other. As seen in FIG. 5A, movement of plate 98 in a counterclockwise direction actuates switch 110 deenergizing electromagnet 108 and energizing electromagnet 106 which attracts and moves plate 102 into its FIG. 5B position. Movement of plate 98 clockwise from its FIG. 5B position returns switch 110 to its original position, deenergizing electromagnet 106 and energizing electromagnet 108 for moving plate 102 into its FIG. 5A position. Instead of using electromagnets 106, 108 as the motivating force for plate 102 it is possible to provide the plate with an overcenter spring or the like, not shown, actuatable by plate 98 when moved between its two positions.

Figure 6A:
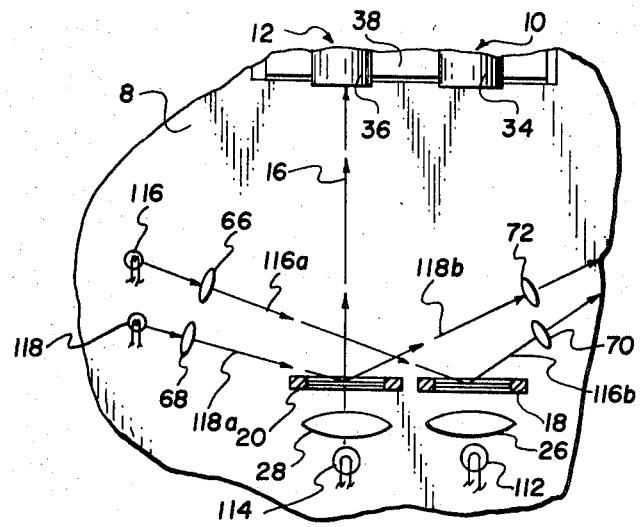
FIG. 6A is a segmental top plan view of another embodiment of a film projector of this invention.
Figure 6B:
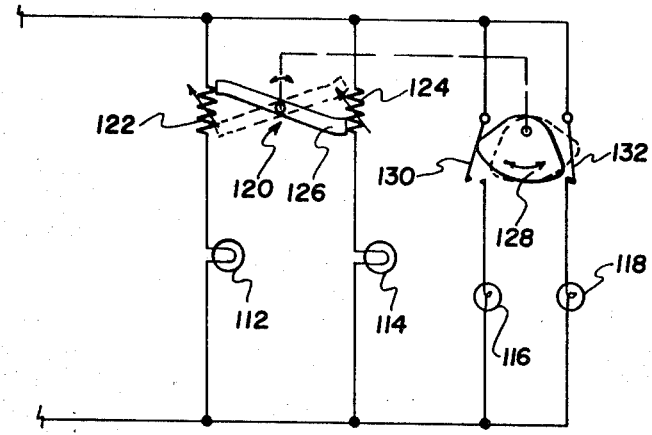
FIG. 6B is an electrical wiring diagram showing the disabling means for the projection of FIG. 6A.

In the embodiment of the invention shown in FIGS. 6A and 6B, the slide projector 8 is provided with a separate illumination source or lamp 112, 114 for the film projection systems 10, 12 respectively, separate lamps 116, 118 for the optical focusing systems comprising optical paths 116a, 116b and 118a, 118b. A disabling means may be provided in the form of any suitable impedance network 120 for alternately varying the voltage applied to or the current flowing through lamps 112, 114 from a maximum value to a minimum value. Such an impedance network for lamps 112, 114 of the film projection systems 10, 12 is shown diagrammatically in FIG. 6B as a pair of spaced resistors 122, 124 over which a shorting bar 126 is moved. In the full line position, a maximum potential is applied to lamp 114 and a minimum potential applied to lamp 112 which is insufficient to provide any illumination. The shorting bar 126 is coupled to a cam 128 for operating a pair of switches 130, 132, and cam 128 is designed to quickly connect and disconnect the power to the appropriate lamps 116, 118 of the optical focusing systems upon initial movement of bar 126 during a lap dissolve operation. Accordingly, in the full line position shown, the film projection system 12 and its corresponding optical focusing system are enabled and the film projection system and its corresponding optical focusing system 118, 118a, 118b are disabled. As shorting bar 126 and cam 128 are moved to their dotted positions by any suitable means, such as a knob or slide transport mechanism, not shown, the potential applied to lamp 112 gradually increases to a maximum and switch 130 is substantially immediately closed applying full potential to lamp 116 thereby enabling the film projection system 10 and corresponding optical focusing system 116, 116a, 116b respectively. At the same time, the potential applied to lamp 114 gradually decreases to a minimum and switch 132 is immediately opened disconnecting the power to lamp 118 thereby disabling the film projection system 12 and the corresponding optical focusing system 118, 118a, 118b.

The invention has been described in detail with particular reference to a preferred embodiment thereof, but it will be understood that variations and modifications can be effected within the spirit and scope of the invention as described hereinabove.

I claim:

1. In a lap dissolve slide projector having illuminating means, first and second optical projection means mounted for cooperation with said illuminating means of the projector, and slide support means for supporting first and second slides in optical alignment with said first and second optical projection means respectively for projection of the slide images onto a remote plane, the combination comprising:
    means for selectively adjusting the distance between each of the first and second optical projection means and the respective first and second slides to a predetermined distance in which the slide image is in focus;
    radiation means,
    radiation sensing means responsive to said radiation means for operating said adjusting means,
    first means for focusing an image of said radiation means at said first slide and for refocusing the reflected image from said first slide onto said radiation sensing means along a first optical focusing path,
    second means for focusing an image of said radiation means at said second slide and for refocusing the reflected image from said second slide onto said radiation sensing means along a second optical path, and
    disabling means selectively movable between a first position for disabling said first focusing means and one of said first and second projection means and enabling said second focusing means wherein said adjusting means automatically adjusts the distance between said second optical projection means and said second slide to said predetermined distance, and a second position for disabling said second focusing means and the other of said first and second projection means and enabling said first focusing means wherein said adjusting means automatically adjusts the distance between said first optical projection means and said first slide to said predetermined distance.

2. The invention according to claim 1 wherein said disabling means comprises a movable member having a first mask for disabling one of said first and second optical projection means, and a second mask for blocking a corresponding one of said first and second optical focusing paths.

3. The invention according to claim 2 wherein said member is a pivotal plate, said first mask comprises a laterally extending first flange on said plate and said second mask comprises a laterally extending second flange on said plate spaced from said first flange.

4. The invention according to claim 1 wherein said disabling means is mounted intermediate said first and second optical projection means and said first and second slides, and comprises a pivotal plate having a laterally extending first flange for blocking one of said first and second optical projection paths, and a laterally extending second flange on said plate angularly spaced from said first flange for blocking a corresponding one of said first and second optical focusing paths.

5. The invention according to claim 1 wherein said disabling means comprises a first movable member having a first mask for blocking one of said first and second optical projection paths, a second member in frictional engagement with said first member and having a second mask for blocking a corresponding one of said first and second optical focusing paths, and spaced stop members engageable by said second member to limit movement of said second member relative to said first member.

6. The invention according to claim 1 wherein said disabling means comprises a first movable member having a first mask for blocking one of said first and second optical projection paths, a second movable member for blocking a corresponding one of said first and second optical focusing paths, means for moving said second member in timed relation to movement of said first member, and means responsive to movement of said first member for operating said moving means for said second member.

7. The invention according to claim 6 wherein said moving means for said second member comprises a pair of spaced electromagnets, and said means for operating said moving means comprises switch means actuatable by said first member.

8. The invention according to claim 1 wherein said illuminating means comprises first and second lamps for said first and second optical projection systems respectively, said radiation means comprises third and fourth lamps for said first and second optical focusing systems respectively, and said disabling means comprises first means for simultaneously alternately increasing the current flowing through one of said first and second lamps to a maximum while decreasing the current flowing through the other of said first and second lamps, said disabling means further comprises second means coupled to said first means for simultaneously energizing one of said third and fourth lamps corresponding to said one of said first and second lamps and deenergizing the other of said third and fourth lamps corresponding to said other of said first and second lamps.

9. The invention according to claim 8 wherein said first means comprises variable resistors, and said second means comprises switches actuatable by a cam.

10. The invention according to claim 8 wherein said first means comprises first and second variable resistors connected to said first and second lamps respectively, a shorting bar slidably movable on said first and second resistors to change their resistive values, and said second means comprises first and second switches connected to said third and fourth lamps, and a cam for alternately opening and closing said first and second switches.